United States Patent [19]
Young

[11] Patent Number: 5,513,361
[45] Date of Patent: Apr. 30, 1996

[54] METHOD AND APPARATUS FOR REDUCING POWER CONSUMPTION OF A FAN IN A COMPUTER SYSTEM

[75] Inventor: Bruce A. Young, Beaverton, Oreg.

[73] Assignee: Intel Corporation, Santa Clara, Calif.

[21] Appl. No.: 279,544

[22] Filed: Jul. 25, 1994

[51] Int. Cl.$^6$ ........................................ G06F 1/32
[52] U.S. Cl. ................ 395/750; 364/707; 364/273.1; 364/273.2; 364/273.3; 364/264.6; 364/DIG. 1
[58] Field of Search ................... 395/750, 550; 364/707, 483, 557; 365/227

[56] References Cited

U.S. PATENT DOCUMENTS

| | | | |
|---|---|---|---|
| 4,151,611 | 4/1979 | Sugawara et al. | 365/227 |
| 4,279,020 | 7/1981 | Christian et al. | 395/750 |
| 4,293,927 | 10/1981 | Hoshii | 395/750 |
| 4,381,552 | 4/1983 | Nocilini et al. | 364/707 |
| 4,615,005 | 9/1986 | Maejima et al. | 395/550 |
| 4,642,441 | 2/1987 | Kenyon | 392/365 |
| 4,698,748 | 10/1987 | Juzswik et al. | 395/750 |
| 4,712,196 | 12/1987 | Uesugi | 365/229 |
| 4,809,163 | 2/1989 | Hirosawa et al. | 395/750 |
| 4,842,431 | 6/1989 | Katsukawa | 400/719 |
| 4,980,836 | 12/1990 | Carter et al. | 364/483 |
| 5,247,805 | 9/1993 | Dennis | 62/184 |

*Primary Examiner*—Gopal C. Ray
*Attorney, Agent, or Firm*—Blakely, Sokoloff, Taylor & Zafman

[57] ABSTRACT

A circuit for controlling power consumption of a fan within a computer system having a central processing unit (CPU) is described. The circuit includes a filter circuit coupled to receive a periodical pulse signal for detecting duty cycle of the periodical pulse signal by converting the periodical pulse signal into an analog signal. The analog signal has a voltage level proportional to the duty cycle of the periodical pulse signal. The periodical pulse signal is generated to control the CPU to be operational between predetermined intervals when the CPU is in an inactive state. A comparator circuit is coupled to the filter circuit for comparing the voltage level of the analog signal with a predetermined voltage level. When the voltage level of the analog signal is below the predetermined voltage level, the comparator circuit generates a switching signal. A switching circuit is coupled to (1) a power supply, (2) the fan, and (3) the comparator circuit for disconnecting the power supply from the fan when the switching signal is generated by the comparator circuit so as to substantially reduce the power consumption of the fan in the computer system when the CPU is in the inactive state. A computer system having the circuit for controlling power consumption of a fan in the system and a method for controlling power consumption of a fan in a computer system are also described.

19 Claims, 3 Drawing Sheets

METHOD AND APPARATUS FOR REDUCING POWER CONSUMPTION OF A FAN IN A COMPUTER SYSTEM

FIELD OF THE INVENTION

The present invention pertains to the field of power consumption in computer systems. More particularly, this invention relates to a method and apparatus of controlling a fan of a heat dissipation system in a computer system having a central processing unit ("CPU") such that when the CPU of the computer system is not fully operational, the fan is powered off to reduce power consumption of the computer system.

BACKGROUND OF THE INVENTION

Heat dissipation in a computer system that typically includes a central processing unit ("CPU") is always a significant concern. This is due to the fact that heat is typically generated in the computer system during operation. If the heat generated inside the computer system is not properly dissipated, the temperature inside the computer system typically rises. The temperature rise in the computer system may cause the computer system to malfunction. One reason for the malfunction is that the electronic characteristics of many integrated circuit ("IC") devices vary depending on temperature. Another reason for the malfunction is that the heat generated by the computer system can cause the temperature inside the computer system to vary from point to point. This is typically the case when high density IC devices are employed that yield more heat than other IC devices in the system. The temperature variation from point to point inside the computer system may also cause the computer system to malfunction in addition, the IC devices may be damaged by the temperature rise.

One prior art scheme to dissipate heat from a computer system or a data processing system is to employ a forced-air cooling system in the computer system. Forced-air cooling typically accelerates the heat exchange from the IC devices of the computer system to air. This is typically accomplished by using a fan to force cold air flow through the IC devices. The heated air is then expelled from the computer system.

Another prior art scheme to improve the forced-air cooling system is to use metal cold plates that are connected to the IC devices of the computer system to remove the heat from the IC devices. The cold plates have a low thermal resistance and can more efficiently transfer the heat away from the IC devices. The cold plates are then cooled by the fan to blow cold air through them.

Power consumption in a computer system is also a significant concern. This is especially the case when the powered system is a portable unit. Therefore, when full operation of the computer system is not desired or necessary, it is important to control the power consumption of the computer system. One prior art scheme of conserving power in a computer system is to have a "sleeping mode" for the CPU of the computer system. This prior art scheme is described in U.S. Pat. No. 4,381,552, issued Apr. 26, 1983, and entitled STANDBY MODE CONTROLLER UTILIZING MICROPROCESSOR. The apparatus disclosed in the above-referenced patent generates a $\overline{\text{WAIT}}$ signal to the CPU when full operation is not required to put the CPU in a standby mode where power consumption is reduced. During this period, sampling occurs at intervals in order to activate the device fully when full operation is required.

When the CPU is put into the standby mode or "sleeping mode", the CPU may no longer need cooling because the CPU does not generate much heat when in standby mode. Therefore, the fan of the cooling system can be powered off at this time in order to further conserve the power of the computer system.

One prior scheme of controlling the fan uses temperature sensing devices. While this may be an effective way for controlling the speed of the fan to compensate for ambient temperature differences, one disadvantage of this prior scheme is that it does not work well for determining when the CPU no longer needs cooling due to a low effective (or stopped) clock rate. Another disadvantage of this prior approach is that the temperature sensing device must be placed in close proximity to the CPU in order to properly determine if the temperature of the CPU is rising. This typically increases technical difficulty in implementation because placing the temperature sense devices close to the CPU in the computer system is typically difficult. In addition, the implementation may be costly.

Another prior technique for controlling the power consumption of the fan is to have an output port (e.g., a register) written by software to directly control the on and off condition of the fan. One disadvantage of this prior technique is that because the power control of the fan is accomplished by software, there is always the possibility of a software bug or error. The software bug or error may cause the fan to be left off when the CPU is actually running. This could lead to heat damage of the CPU.

SUMMARY AND OBJECTS OF THE INVENTION

One of the objects of the present invention is to provide techniques that reduce power consumption in a computer system.

Another object of the present invention is to provide a method and apparatus for reducing power consumption of a fan in a computer system.

A further object of the present invention is to provide a method and apparatus for turning off a fan in a computer system when the CPU of the computer system is controlled to be periodically operational such that power consumption of the computer system is substantially reduced.

A still further object of the present invention is to provide a method and apparatus for effectively powering off a fan in a computer system in a cost effective manner when the CPU of the computer system is not operating.

A circuit for controlling power consumption of a fan within a computer system having a central processing unit (CPU) is described. The circuit includes a filter circuit coupled to receive a periodical pulse signal for detecting duty cycle of the periodical pulse signal by converting the periodical pulse signal into an analog signal. The analog signal has a voltage level proportional to the duty cycle of the periodical pulse signal. The periodical pulse signal is generated to control the CPU to be operational between predetermined intervals when the CPU is in an inactive state. A comparator circuit is coupled to the filter circuit for comparing the voltage level of the analog signal with a predetermined voltage level. When the voltage level of the analog signal is below the predetermined voltage level, the comparator circuit generates a switching signal. A switching circuit is coupled to (1) a power supply, (2) the fan, and (3) the comparator circuit for disconnecting the power supply from the fan when the switching signal is generated by the comparator circuit so as to substantially reduce the power consumption of the fan in the computer system when the CPU is in the inactive state.

A computer system having the circuit for controlling power consumption of a fan in the system is described. In addition to the circuits described above, the computer system also includes a power managing logic coupled to the CPU for determining the inactive state of the CPU and for generating the periodical pulse signal to allow the CPU to be operational between predetermined intervals when the CPU is determined to be in the inactive state. When the power managing logic detects that the CPU is not in the inactive state, the power managing logic stops generating the periodical pulse signal.

A method for controlling power consumption of a fan in a computer system is also described. The method includes the step of receiving a periodical pulse signal having a duty cycle. The periodical pulse signal is generated to control the CPU to be operational between predetermined intervals when the CPU is in an inactive state. The duty cycle of the periodical pulse signal is then detected by converting the periodical pulse signal into an analog signal. The analog signal has a voltage level proportional to the duty cycle of the periodical pulse signal. The voltage level of the analog signal is then compared with a predetermined voltage level. When the voltage level of the analog signal is below the predetermined voltage level, the fan is then disconnected from the power supply so as to substantially reduce the power consumption of the fan in the computer system when the CPU is in the inactive state.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
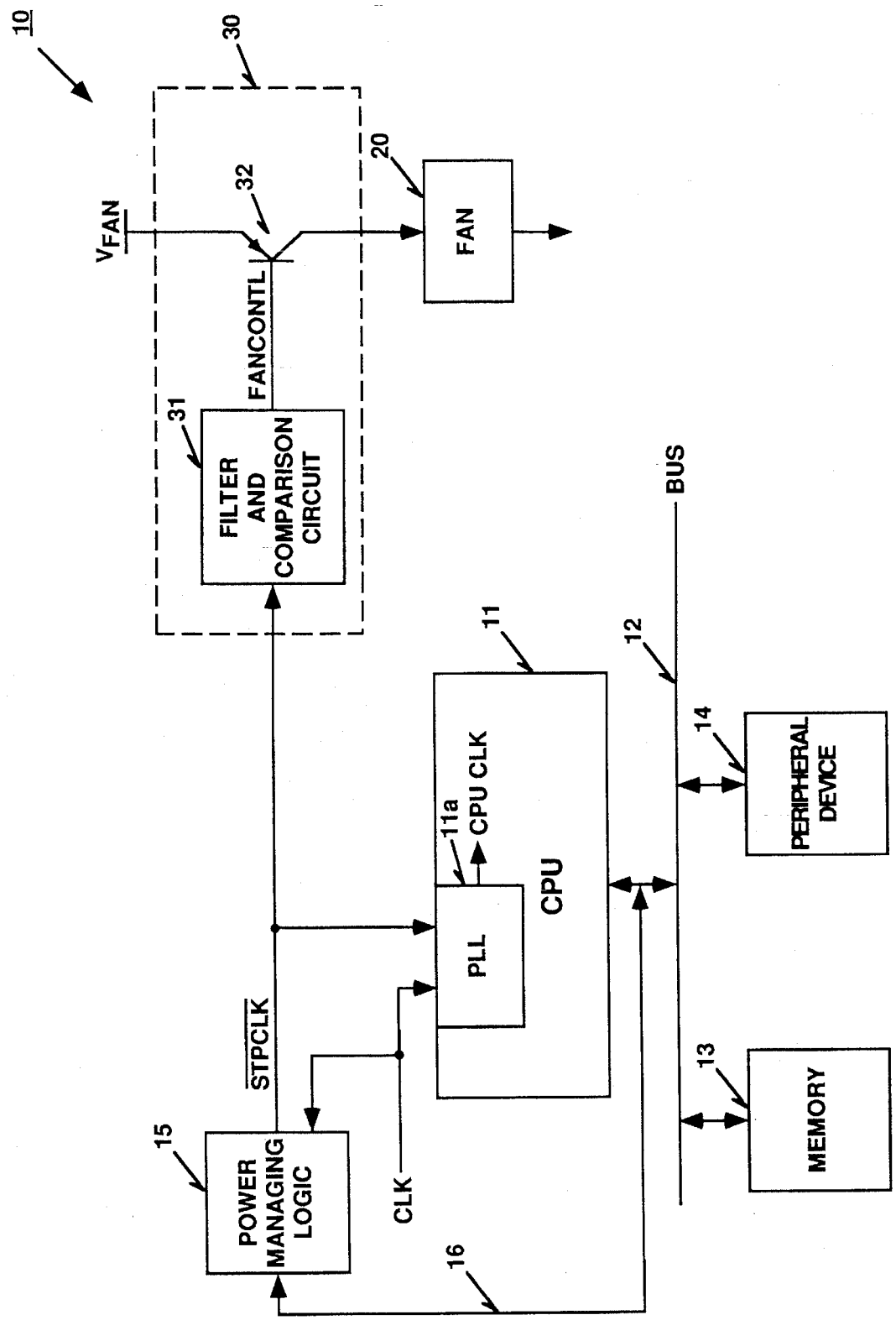
FIG. 1 is a block diagram of a computer system that includes a fan, a control circuit, and a power manager logic in accordance with one embodiment of the present invention.

FIG. 1 shows a computer system 10 that implements one embodiment of the present invention. Computer system 10 includes a system bus 12 that is connected to a CPU 11, a memory 13, and a peripheral device 14. In addition, computer system 10 also includes a power managing logic 15, a fan 20, and a control circuit 30 for controlling the power consumption of fan 20. Power managing logic 15 monitors activities of CPU 11 and memory 13 and in turn controls the power consumption of these components.

For one embodiment, computer system 10 is a personal computer system. For alternative embodiments, computer system 10 can be any other type of computer system. For example, computer system 10 can be a workstation, a mainframe or a mini-computer.

For one embodiment, CPU 11 of computer system 10 includes a microprocessor manufactured by Intel Corporation of Santa Clara, Calif. Alternatively, CPU 11 may include more than one microprocessor.

System bus 12 is used in computer system 10 as the backplane bus for transfer of data among various components of computer system 10. Memory 13 can be accessed by CPU 11 via system bus 12. Memory 13 stores data and programs that are needed for the operation of computer system 10.

Peripheral device 14 performs a predefined peripheral operation. Peripheral device 14 can be any kind of peripheral device. For example, peripheral device 14 can be a keyboard, a display, a hard disk drive, a nonvolatile memory card, or a modem. In addition, computer system 10 may include more peripheral devices than peripheral device 14.

As can be seen from FIG. 1, CPU 11 includes a phase lock loop ("PLL") 11a. PLL 11a generates a CPU clock signal CPUCLK. The CPUCLK signal is applied to various circuits of CPU 11 for providing timing reference for the operations of CPU 11. PLL 11a generates the CPUCLK signal from an external clock signal CLK applied to CPU 11. When the CPUCLK signal is generated, CPU 11 is in an active mode in which CPU 11 is fully operational.

However, CPU 11 may sometimes idle (i.e., in an inactive state) when CPU 11 is in the active mode. This is especially the case when CPU 11 is a high speed and high performance microprocessor. When CPU 11 idles in the active mode, CPU 11 does not perform any useful functions. However, CPU 11 still consumes substantially the equivalent amount of power as when CPU 11 is functioning fully. Therefore, it is desirable that the power consumption of CPU 11 be reduced to conserve the power of computer system 10 when CPU 11 idles (i.e., in the inactive state). By causing CPU 11 to enter a standby mode when CPU 11 is in the inactive state of the active mode, the power consumption of CPU 11 can be substantially reduced.

One way of causing CPU 11 to enter the standby mode is to stop or halt the CPUCLK signal. When the CPUCLK signal is stopped, CPU 11 halts its execution and enters the standby mode or sleep mode. In the standby mode, all the internal states of CPU 11 are frozen with all CPU internal RAM and control registers remaining intact. CPU 11 is not operational in the standby mode. This reduces the power consumption of CPU 11 substantially. The power supply of CPU 11 in the standby mode is, however, still maintained. When the CPUCLK signal is resumed, CPU 11 departs the standby mode and returns to the active mode.

Alternatively, when CPU 11 is in the standby mode, the power supply is also removed from CPU 11 in addition to the halt of the CPUCLK signal. In this case, the internal states of CPU 11 are stored in memory 13 from CPU 11 in a memory write operation prior to the power down. CPU 11 departs the standby mode when the power supply and the CPUCLK signal are resumed. CPU 11 then performs a memory read operation to fetch the internal states stored in memory 13.

CPU 11 receives a $\overline{\text{STPCLK}}$ signal from power managing logic 15 to stop or halt the CPUCLK signal. The $\overline{\text{STPCLK}}$ signal is a stop clock or clock disable signal to CPU 11 which turns on and off the CPUCLK signal inside CPU 11.

Figure 3:
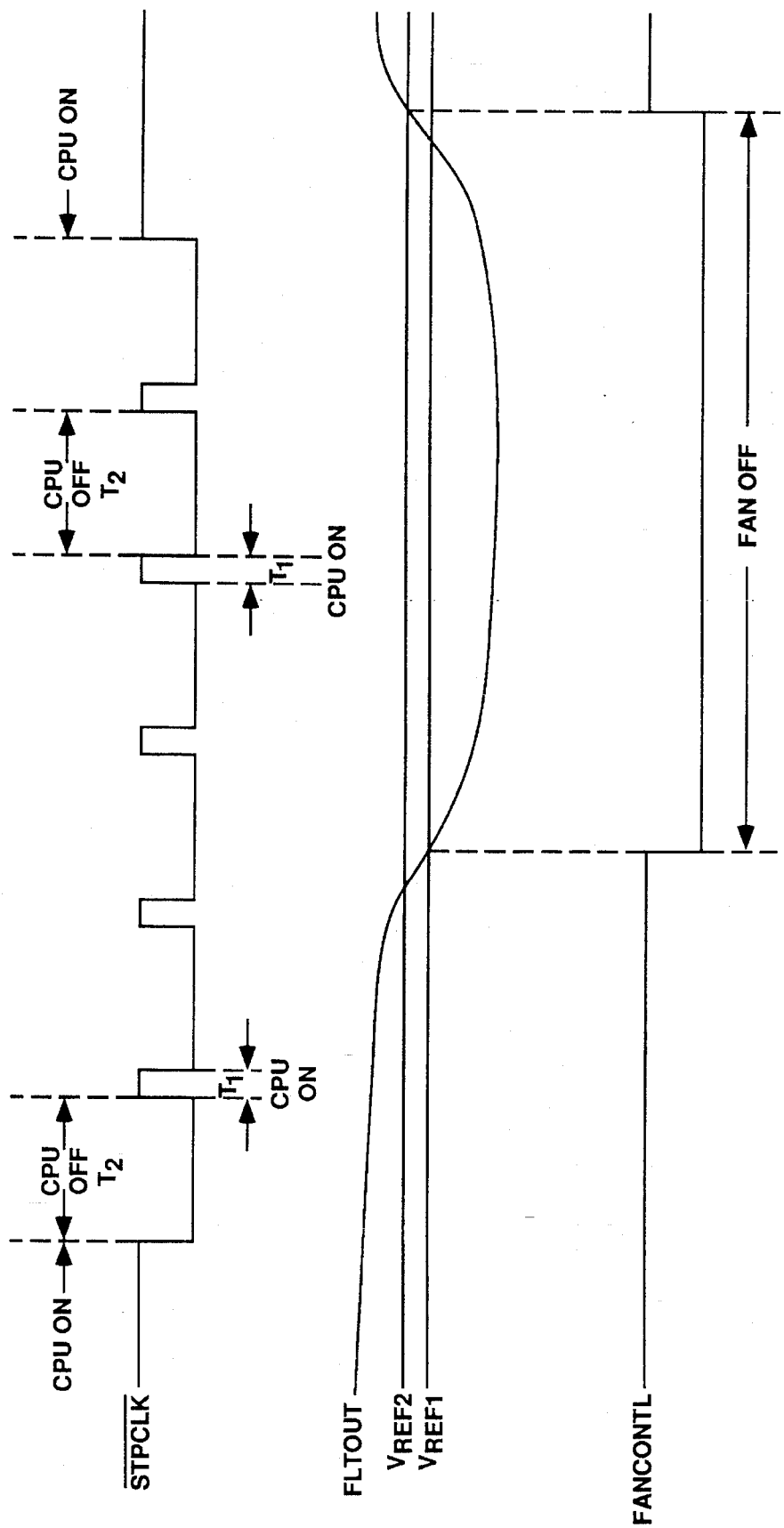
FIG. 3 shows the signal relationship of the $\overline{\text{STPCLK}}$ signal, a FLTOUT signal, and the FANCONTL signal generated by various circuits of the computer system of FIGS. 1 and 2.

The $\overline{\text{STPCLK}}$ signal can be a level signal when it is deasserted. When this occurs, the $\overline{\text{STPCLK}}$ signal does not cause the CPUCLK signal to be halted and CPU 11 is in the active mode. When the $\overline{\text{STPCLK}}$ signal is asserted, the CPUCLK signal is turned off and CPU 11 enters the standby mode. When CPU 11 is in the standby mode, it is, however, desirable that CPU 11 periodically returns to the active mode for a short time interval in order to activate CPU 11 fully if full operation is required. In addition, CPU 11 may need to refresh its cache memory or do other house keeping functions periodically. By periodically causing CPU 11 to be fully operational for a short time interval while CPU 11 is in the standby mode, CPU 11 can relatively quickly respond to a request for full CPU operation from the standby mode while the power consumption of CPU 11 is still substantially reduced. This therefore requires the $\overline{\text{STPCLK}}$ signal to be a periodic pulse signal when CPU 11 is put into the standby mode by the $\overline{\text{STPCLK}}$ signal. FIG. 3 shows the waveform of the $\overline{\text{STPCLK}}$ signal, which will be described in more detail below.

In one embodiment as shown in FIG. 1, the $\overline{\text{STPCLK}}$ signal is applied to PLL 11a of CPU 11. PLL 11a then gates on and off the CPUCLK signal under control of the $\overline{\text{STPCLK}}$ signal. When the $\overline{\text{STPCLK}}$ signal is asserted, PLL 11a gates off the CPUCLK signal such that CPU 11 enters the standby mode. When the $\overline{\text{STPCLK}}$ signal is deasserted, PLL 11a resumes the generation of the CPUCLK signal such that CPU 11 departs the standby mode and returns to the active mode. Whenever the $\overline{\text{STPCLK}}$ signal is deasserted for a predetermined short time interval (i.e., $T_1$ time period in FIG. 3) after being asserted for a predetermined time period (i.e., $T_2$ time period in FIG. 3), PLL 11a generates the CPUCLK signal during that predetermined short time interval $T_1$. This periodically turns on CPU 11 in the standby mode, as described above.

Alternatively, PLL 11a does not turn off the CPUCLK signal in accordance with the $\overline{\text{STPCLK}}$ signal. In this alternative embodiment, CPU 11 includes a switching logic (not shown) that receives both the CPUCLK signal and the $\overline{\text{STPCLK}}$ signal. The switching logic receives the CPUCLK signal from PLL 11a before the signal is applied to other circuits of CPU 11. When the $\overline{\text{STPCLK}}$ signal is asserted, the switching logic turns off the CPUCLK signal after some delay.

In a further alternative embodiment, when the $\overline{\text{STPCLK}}$ signal is asserted, CPU 11 performs an interrupt operation to enter the standby mode in which CPU 11 turns off the CPUCLK signal. CPU 11 then operates under the $\overline{\text{STPCLK}}$ signal which has a much slower clock rate. This clocked $\overline{\text{STPCLK}}$ signal then allows CPU 11 to operate at a much slower rate.

In one embodiment as shown in FIG. 1, power managing logic 15 also receives the CLK signal. Power managing logic 15 generates the periodic pulse $\overline{\text{STPCLK}}$ signal in synchronization with the CLK signal.

When the $\overline{\text{STPCLK}}$ signal becomes a periodic pulse signal to periodically awake CPU 11 in the standby mode, the duty cycle of the $\overline{\text{STPCLK}}$ signal determines the ratio between the time interval during which CPU 11 is activated by the $\overline{\text{STPCLK}}$ signal (i.e., the $T_1$ time period in FIG. 3) and the time period during which CPU 11 is halted from its execution (i.e., the $T_2$ time period in FIG. 3). As can be seen from FIG. 3, the duty cycle of the $\overline{\text{STPCLK}}$ signal is proportional to the ratio of the $T_1$ and $T_2$ time periods. The higher the duty cycle of the $\overline{\text{STPCLK}}$ signal is, the more time CPU 11 is fully operational in the standby mode. The lower the duty cycle is, the less time CPU 11 is fully operational in the standby mode.

As is known, CPU 11 generates heat when CPU 11 is fully operational. When CPU 11 is not operational, CPU 11 does not generate much heat. Therefore, when CPU 11 is in the standby mode, the higher the duty cycle of the $\overline{\text{STPCLK}}$ signal is, the more heat CPU 11 generates. The lower the duty cycle of the $\overline{\text{STPCLK}}$ signal is, the less heat CPU 11 generates.

In one embodiment, the $\overline{\text{STPCLK}}$ signal is deasserted for ten microseconds during every sixteen milliseconds. In this embodiment, the duty cycle of the $\overline{\text{STPCLK}}$ signal is then approximately equal to 0.0625%. Therefore, it can be seen from the above that when the duty cycle of the $\overline{\text{STPCLK}}$ signal is substantially low, CPU 11 is substantially not operational in the standby mode.

Power managing logic 15 monitors the activities of CPU 11 via bus 16. The configuration of power managing logic 15 and its operation of monitoring the activity of CPU 11 in order to generate the $\overline{\text{STPCLK}}$ signal is known in the art and will not be described in more detail below. In one embodiment, power managing logic 15 is a microcontroller dedicated for the power control of computer system 10.

When power managing logic 15 detects that CPU 11 idles for a predetermined time period, it asserts the $\overline{\text{STPCLK}}$ signal to put CPU 11 in the standby mode. In one embodiment, the predetermined time period is sixteen milliseconds. In another embodiment, the predetermined time period may be longer or shorter.

As described above, when CPU 11 is in the standby mode and the duty cycle of the $\overline{\text{STPCLK}}$ signal is substantially low, CPU 11 is substantially non-operational and does not generate much heat. When this occurs, CPU 11 does not require any cooling and fan 20 can therefore be turned off in order to further conserve power of computer system 10.

However, fan 20 cannot be simply turned off when CPU 11 is in the standby mode. This is because the $\overline{\text{STPCLK}}$ signal is a pulse signal which causes CPU 11 to be periodically operational in the standby mode. If the duty cycle of the $\overline{\text{STPCLK}}$ signal exceeds certain value, CPU 11 may be operational for a relatively long time period in the standby mode. This may cause CPU 11 to generate enough heat that requires fan 20 to be turned on in the standby mode. Therefore, whether fan 20 should be switched off when CPU 11 is put into the standby mode should be determined by the duty cycle of the $\overline{\text{STPCLK}}$ signal.

However, because the cycle rate of the $\overline{\text{STPCLK}}$ signal is still much higher than a mechanical device such as fan 20 can react, the pulsed $\overline{\text{STPCLK}}$ signal cannot be used to directly switch on and off the power supply of fan 20. Instead, the $\overline{\text{STPCLK}}$ signal is supplied to control circuit 30. Control circuit 30 then determines the duty cycle of the $\overline{\text{STPCLK}}$ in order to determine whether fan 20 needs to be switched off when CPU 11 is in the standby mode. If the duty cycle of the $\overline{\text{STPCLK}}$ is below a predetermined threshold value, then control circuit 30 turns off fan 20 by disconnecting the power supply $V_{FAN}$ from fan 20 because cooling for CPU 11 is not required. If the duty cycle of the $\overline{\text{STPCLK}}$ signal exceeds the predetermined threshold value, then control circuit 30 switches on fan 20 because cooling for CPU 11 is still required.

The predetermined threshold value of the duty cycle can be determined by first determining the threshold temperature at which cooling is required for CPU 11 in the standby mode. This then determines the amount of heat CPU 11 generates to raise the temperature to the threshold temperature. Based on this and the thermal characteristics of CPU 11, the predetermined threshold value of the duty cycle of the $\overline{\text{STPCLK}}$ signal at which fan 20 is required to be turned on can then be determined.

Figure 2:
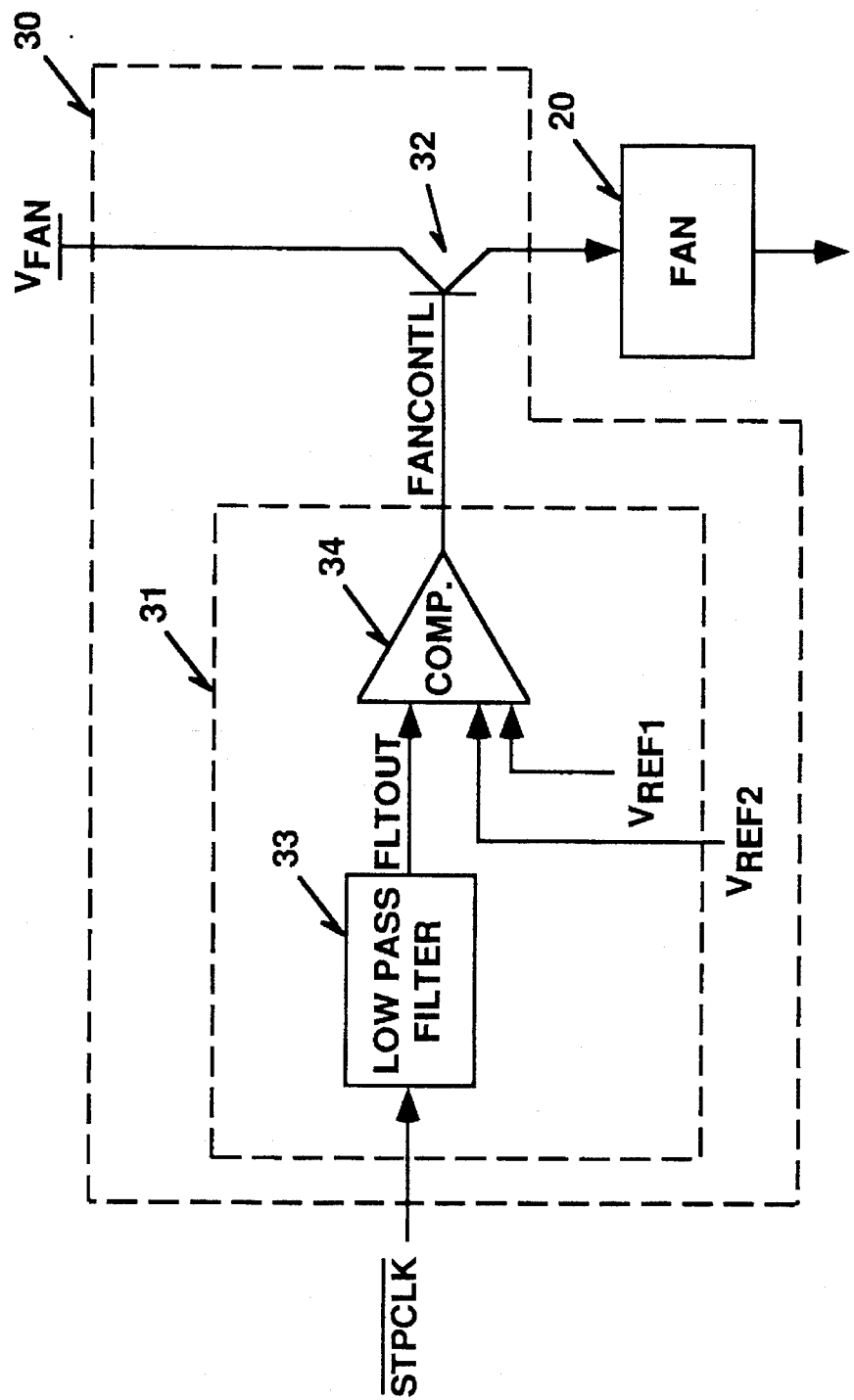
FIG. 2 is a block diagram of the control circuit of FIG. 1 that controls power connection to the fan in the computer system in accordance with a periodical pulse signal $\overline{\text{STPCLK}}$.

Referring now to FIGS. 1 and 2, control circuit 30 includes a filter and comparison circuit 31 and a switching transistor 32. Filter and comparison circuit 31 receives the $\overline{\text{STPCLK}}$ signal. Filter and comparison circuit 31 then supplies a FANCONTL signal to the base of a PNP bipolar of transistor 32. The FANCONTL signal is a control signal that controls the on and off of fan 20. Transistor 32 has its emitter connected to a fan power supply $V_{FAN}$ and its collector connected to fan 20. The collector of switching transistor 32 is connected to the power supply input of fan 20 in a conventional manner.

In another embodiment, switching transistor 32 is an NPN bipolar transistor. In alternative embodiments, transistor 32 may be other types of switching transistors or logic circuits. For example, transistor 32 may be a field-effect metal-oxide semiconductor ("MOS") switching transistor.

Filter and comparison circuit 31 includes a filter 33 and a comparator 34. Filter 33 receives the $\overline{\text{STPCLK}}$ signal and generates an analog FLTOUT signal to comparator 34. Comparator 34 also receives a reference voltage $V_{REF1}$. Comparator 34 outputs the FANCONTL signal to transistor 32.

Filter 33 is a low pass filter circuit. Filter 33 is used to detect the duty cycle of the $\overline{\text{STPCLK}}$ signal. Filter 33 does this by converting the pulsed $\overline{\text{STPCLK}}$ signal into the analog voltage signal FLTOUT. The voltage level of the analog FLTOUT signal, when reaching a relatively stable steady state level, is proportional to the duty cycle of the $\overline{\text{STPCLK}}$ signal. FIG. 3 schematically illustrates the wave form of the FLTOUT signal, which will be described in more detail below.

The FLTOUT signal is then applied from filter 33 to comparator 34 to be compared with a reference voltage $V_{REF1}$. The reference voltage $V_{REF1}$ is a predetermined voltage which represents the predetermined threshold value for the duty cycle as described above. When the voltage level of the FLTOUT signal is below the $V_{REF1}$ voltage, comparator 34 does not assert the FANCONTL signal to transistor 32 which in turn disconnects the $V_{FAN}$ power supply from fan 20. When the voltage level of the FLTOUT signal is, however, above the $V_{REF1}$ voltage, comparator 34 asserts the FANCONTL signal which in turn switches on transistor 32 to connect the $V_{FAN}$ power supply to fan 20.

In one embodiment, the voltage of $V_{FAN}$ is approximately 5 volts. In another embodiment, the voltage of $V_{FAN}$ is approximately 12 volts. Alternatively, the voltage of $V_{FAN}$ may be higher or lower than 12 volts.

As described above, filter 33 is a low pass filter circuit. In one embodiment, filter 33 is a digital low pass filter circuit. In another embodiment, filter 33 is an analog low pass filter circuit. Alternatively, filter 33 can be any other known circuit than can detect the duty cycle of a pulse signal.

Comparator 34 can be any kind of known comparator circuit. In one embodiment, comparator 34 is a differential amplifier circuit.

In another embodiment as shown in FIG. 2, comparator 34 receives a second reference voltage $V_{REF2}$. The second voltage $V_{REF2}$ has a voltage level higher than that of the $V_{REF1}$ voltage (see from FIG. 3). Comparator 34 compares the voltage level of the FLTOUT signal with the $V_{REF2}$ voltage in order to determine when the FANCONTL signal should be asserted. Comparator 34 compares the $V_{REF2}$ voltage with the voltage of the FLTOUT signal only after comparator 34 deasserts the FANCONTL signal. By having a second reference voltage $V_{REF2}$, it can be effectively ensured that comparator 34 does not assert the FANCONTL signal when the FLTOUT is not reaching its steady state level or the $\overline{\text{STPCLK}}$ signal is interfered with glitches. In addition, comparator 34 may include additional logic that causes comparator 34 to delay asserting the FANCONTL signal for a predetermined time period when the voltage level of the FLTOUT signal is above the $V_{REF1}$ or $V_{REF2}$ voltage. At the end of the delay, if the voltage level of the FLTOUT signal is still above the $V_{REF1}$ or $V_{REF2}$ voltage, then comparator 34 asserts the FANCONTL signal.

The voltage level of the $V_{REF1}$ and $V_{REF2}$ voltages are determined in accordance with the predetermined threshold value of the duty cycle of the $\overline{\text{STPCLK}}$ signal, the voltage level of the $\overline{\text{STPCLK}}$ signal, and other factors. In one embodiment, the voltage level of the $\overline{\text{STPCLK}}$ signal is approximately 5 volts and the $V_{REF1}$ voltage is approximately 2 volts. The $V_{REF2}$ voltage may be approximately 0.25 volts or 0.5 volts higher than the $V_{REF1}$ voltage. In another embodiment, the voltage level of the $\overline{\text{STPCLK}}$ signal is approximately 3 volts and the $V_{REF1}$ voltage is approximately 1 volt. Again, the $V_{REF2}$ voltage may be 0.25 volts or 0.5 volts higher than the $V_{REF1}$ voltage. Alternatively, the $V_{REF1}$ and $V_{REF2}$ voltages may have other voltages levels. Again the $V_{REF1}$ and $V_{REF2}$ voltages are determined in accordance with the thermal characteristics of CPU 11, the characteristics of fan 20, the characteristics of filter 33, and the voltage level of the $\overline{\text{STPCLK}}$ signal.

Referring to FIGS. 1 through 3, the operation of control circuit is now described. When the $\overline{\text{STPCLK}}$ signal is a deasserted level signal (see FIG. 3), the CPUCLK signal is on and CPU 11 is in the active mode. Because the $\overline{\text{STPCLK}}$ signal is a high voltage level signal when deasserted, filter 33 does not filter anything from the $\overline{\text{STPCLK}}$ signal and only generates a high voltage FLTOUT signal (FIG. 3). This high voltage FLTOUT signal is then compared at comparator 34 with the $V_{REF1}$ voltage. Because the voltage level of the FLTOUT is higher than the $V_{REF1}$ voltage, comparator 34 asserts the FANCONTL signal which turns on transistor 32 to connect the $V_{FAN}$ power supply fan 20.

When power managing logic 15 asserts the $\overline{\text{STPCLK}}$ signal, CPU 11 enters the standby mode. At this time, the $\overline{\text{STPCLK}}$ signal becomes a pulse signal (see FIG. 3) which periodically causes CPU 11 to return to the active mode (see FIG. 3). Filter 33 then filters the $\overline{\text{STPCLK}}$ signal to generate the FLTOUT signal, the voltage level of which is proportional to the duty cycle of the $\overline{\text{STPCLK}}$ signal. The voltage level of the FLTOUT signal is then compared with the $V_{REF1}$ voltage at comparator 34 and comparator 34 deasserts the FANCONTL signal when the voltage level of the FLTOUT signal is below the $V_{REF1}$ voltage. As can be seen from FIG. 3, because the $\overline{\text{STPCLK}}$ signal is not initially asserted, it takes a few pulses for the voltage level of the FLTOUT signal to reach its steady state.

After comparator 34 deasserts the FANCONTL signal, comparator 34 does not assert the FANCONTL signal even though the $\overline{\text{STPCLK}}$ signal is periodically deasserted to the high voltage state (see FIG. 3). This is because the $\overline{\text{STPCLK}}$ signal is filtered by filter 33 and the voltage level of the FLTOUT signal applied to comparator 34 represents the duty cycle of the $\overline{\text{STPCLK}}$ signal.

The voltage level of the FLTOUT signal changes in accordance with the duty cycle of the $\overline{\text{STPCLK}}$ signal. When the $\overline{\text{STPCLK}}$ signal is deasserted to be a level signal to allow CPU 11 to return to the active mode (see FIG. 3), the voltage level of the FLTOUT signal rises accordingly. When the voltage level of the FLTOUT signal exceeds the $V_{REF2}$ voltage, comparator 34 asserts the FANCONTL signal which then connects the $V_{FAN}$ power supply to fan 20.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A circuit for controlling power consumption of a fan within a computer system having a central processing unit (CPU), comprising:
   (A) a filter circuit coupled to receive a periodical pulse signal for detecting duty cycle of the periodical pulse signal by converting the periodical pulse signal into an analog signal, wherein the analog signal has a voltage level proportional to the duty cycle of the periodical pulse signal;
   (B) a comparator circuit coupled to the filter circuit for comparing the voltage level of the analog signal with a predetermined voltage level to generate a switching signal when the voltage level of the analog signal is below the predetermined voltage level; and
   (C) a switching circuit coupled to (1) a power supply, (2) the fan, and (3) the comparator circuit for disconnecting the power supply from the fan when the switching signal is generated by the comparator circuit so as to substantially reduce the power consumption of the fan in the computer system.

2. The circuit of claim 1, wherein the filter circuit comprises a low pass filter circuit.

3. The circuit of claim 2, wherein the low filter circuit is a digital low pass filter circuit.

4. The circuit of claim 2, wherein the low filter circuit is an analog low pass filter circuit.

5. The circuit of claim 1, wherein the switching circuit further comprises a field effect switching transistor and the switching signal is a logical low voltage signal.

6. The circuit of claim 1, wherein the switching circuit further comprises a bipolar switching transistor.

7. The circuit of claim 1, wherein the comparator circuit further comprises a differential amplifier circuit.

8. The circuit of claim 1, wherein the periodical pulse signal is a clock disable signal, wherein the clock disable signal is applied to the CPU when the CPU is in an inactive state.

9. A computer system, comprising:
   (a) a central processing unit (CPU);
   (b) a fan for dissipating heat generated within the computer system;
   (c) a power managing logic coupled to the CPU for detecting operational state of the CPU and for generating a periodical pulse signal that varies depending on the operational state of the CPU; and
   (d) a control circuit coupled to (1) the power managing logic, (2) the fan, and (3) a power supply for controlling power consumption of the fan in the computer system by determining duty cycle of the periodical pulse signal, wherein the control circuit further comprises
     (i) a filter and comparison circuit coupled to the power managing logic for converting the periodical pulse signal into an analog signal with a voltage level proportional to the duty cycle of the periodical pulse signal, and for comparing the voltage level of the analog signal with a predetermined voltage level to generate a switching signal, wherein the filter and comparison circuit deasserts the switching signal when the periodical pulse signal is not applied to the filter and comparison circuit; and
     (ii) a switching circuit coupled to the power supply and the fan for disconnecting the power supply from the fan when the switching signal is asserted by the filter and comparison circuit so as to substantially reduce the power consumption of the fan in the computer system.

10. The computer system of claim 9, wherein the filter and comparison circuit further comprises
   a) a low pass filter circuit coupled to the power managing logic for filtering the periodical pulse signal to generate the analog signal; and
   b) a comparator circuit coupled to the low pass filter and the switching circuit for comparing the voltage level of the analog signal with the predetermined voltage level to generate the switching signal, wherein when the voltage level of the analog signal is below the predetermined voltage level, the comparator asserts the switching signal.

11. The computer system of claim 10, wherein the low pass filter circuit is a digital low pass filter circuit.

12. The computer system of claim 10, wherein the low pass filter circuit is an analog low pass filter circuit.

13. The computer system of claim 10, wherein the comparator circuit further comprises a differential amplifier circuit.

14. The computer system of claim 9, wherein the switching circuit further comprises a field effect switching transistor.

15. The computer system of claim 9, wherein the switching circuit further comprises a bipolar switching transistor.

16. The computer system of claim 9, wherein the periodical pulse signal is a clock disable signal, wherein the power managing logic generates the periodical pulse signal when the power managing logic detects that the CPU is in an inactive mode.

17. In a computer system having a CPU and a fan for dissipating heat generated within the computer system, a method of controlling power consumption of the fan, comprising the steps of:
   (a) receiving a periodical pulse signal having a duty cycle related to operational states of the CPU;
   (b) detecting the duty cycle of the periodical pulse signal by converting the periodical pulse signal into an analog signal, wherein the analog signal has a voltage level proportional to the duty cycle of the periodical pulse signal;
   (c) comparing the voltage level of the analog signal with a predetermined voltage level; and
   (d) disconnecting the power supply from the fan when the voltage level of the analog signal is below the predetermined voltage level so as to substantially reduce the power consumption of the fan in the computer system.

18. The method of claim 17, further comprising the steps of
  i) detecting an inactive state of the CPU by a power managing logic; and
  ii) generating the periodical pulse signal when the CPU is determined to be in the inactive state.

19. The method of claim 18, wherein the periodical pulse signal is a clock disable signal, wherein the power managing logic generates the clock disable signal to control the CPU to be operational between predetermined time intervals when the CPU is in the inactive state.

* * * * *

UNITED STATES PATENT AND TRADEMARK OFFICE
CERTIFICATE OF CORRECTION

PATENT NO. : 5,513,361
DATED : April 30, 1996
INVENTOR(S) : Bruce A. Young

It is certified that error appears in the above-indentified patent and that said Letters Patent is hereby corrected as shown below:

In column 1 at line 35 delete "malfunction in" and insert --malfunction. In--

Signed and Sealed this

Sixth Day of August, 1996

Attest:

BRUCE LEHMAN

Attesting Officer     Commissioner of Patents and Trademarks